(12) United States Patent
Chen et al.

(10) Patent No.: US 12,641,272 B2
(45) Date of Patent: May 26, 2026

(54) LOCAL ILLUMINATION COMPENSATION

(71) Applicant: Tencent America LLC, Palo Alto, CA (US)

(72) Inventors: Lien-Fei Chen, Hsinchu (TW); Xiaozhong Xu, State College, PA (US); Xin Zhao, Santa Clara, CA (US); Roman Chernyak, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 6 days.

(21) Appl. No.: 18/241,011

(22) Filed: Aug. 31, 2023

(65) Prior Publication Data

US 2024/0251095 A1　　Jul. 25, 2024

Related U.S. Application Data

(60) Provisional application No. 63/440,084, filed on Jan. 19, 2023.

(51) Int. Cl.
H04N 19/50 (2014.01)
H04N 19/105 (2014.01)
(Continued)

(52) U.S. Cl.
CPC ........... H04N 19/50 (2014.11); H04N 19/105 (2014.11); H04N 19/129 (2014.11);
(Continued)

(58) Field of Classification Search
CPC .... H04N 19/50; H04N 19/105; H04N 19/129; H04N 19/132; H04N 19/172; H04N 19/176; H04N 19/70
See application file for complete search history.

(56) References Cited

U.S. PATENT DOCUMENTS

| | | | |
|---|---|---|---|
| 11,689,727 B2 * | 6/2023 | Leleannec ............ | H04N 19/137 |
| | | | 375/240.02 |
| 2020/0228796 A1 * | 7/2020 | Seregin ................ | H04N 19/132 |

(Continued)

FOREIGN PATENT DOCUMENTS

| | | | |
|---|---|---|---|
| EP | 3709648 A1 * | 9/2020 | ........... H04N 19/196 |
| JP | 2018-522466 A | 8/2018 | |

(Continued)

OTHER PUBLICATIONS

International Search Report with Written Opinion issued Dec. 20, 2023 in Application No. PCT/US2023/073471 (16 pages).
(Continued)

*Primary Examiner* — Richard A Hansell, Jr.
(74) *Attorney, Agent, or Firm* — ArentFox Schiff LLP

(57) ABSTRACT

Aspects of the disclosure provide methods and apparatuses for video encoding/decoding. In some examples, an apparatus for video decoding includes receiving circuitry and processing circuitry. The processing circuitry receives coded information of a current block in a current picture from a coded video bitstream, the coded information is indicative of applying local illumination compensation (LIC) on the current block according to a reference block in a reference picture. The processing circuitry constructs a parameter set list for the LIC, the parameter set list comprising a plurality of parameter sets for the LIC, and determines a selected parameter set from the parameter set list according to an index that is decoded from the coded video bitstream. The processing circuitry performs the LIC on the current block based on the selected parameter set to generate compensated samples of the current block according to the reference block in the reference picture.

20 Claims, 7 Drawing Sheets

(51) Int. Cl.

| | |
|---|---|
| *H04N 19/129* | (2014.01) |
| *H04N 19/132* | (2014.01) |
| *H04N 19/172* | (2014.01) |
| *H04N 19/176* | (2014.01) |
| *H04N 19/70* | (2014.01) |

(52) U.S. Cl.

CPC ......... *H04N 19/132* (2014.11); *H04N 19/172* (2014.11); *H04N 19/176* (2014.11); *H04N 19/70* (2014.11)

(56) References Cited

U.S. PATENT DOCUMENTS

| | | | | |
|---|---|---|---|---|
| 2020/0336738 A1* | 10/2020 | Xiu | ..................... | H04N 19/159 |
| 2021/0076029 A1* | 3/2021 | Han | ..................... | H04N 19/176 |
| 2021/0227209 A1 | 7/2021 | Liu et al. | | |
| 2021/0266587 A1* | 8/2021 | Liu | ..................... | H04N 19/52 |
| 2021/0329266 A1* | 10/2021 | Andersson | ............. | H04N 19/86 |
| 2021/0352309 A1* | 11/2021 | Liu | ..................... | H04N 19/159 |
| 2022/0159277 A1* | 5/2022 | Urban | .................. | H04N 19/176 |
| 2022/0303526 A1* | 9/2022 | Urban | .................. | H04N 19/105 |
| 2023/0283787 A1* | 9/2023 | Le | ..................... | H04N 19/186 |
| | | | | 375/240.08 |
| 2024/0414366 A1* | 12/2024 | Chubach | ............. | H04N 19/176 |
| 2025/0220208 A1* | 7/2025 | Zhang | .................. | H04N 19/44 |

FOREIGN PATENT DOCUMENTS

| | | | | |
|---|---|---|---|---|
| WO | WO-2022167322 A1 * | 8/2022 | ............. | H04N 19/52 |
| WO | WO-2023093863 A1 * | 6/2023 | ........... | H04N 19/186 |

OTHER PUBLICATIONS

Muhammed Coban, et al., Algorithm description of Enhanced Compression Model 8 (ECM 8), Joint Video Experts Team (JVET) of ITU-T SG 16 WP 3 and ISO/IEC JTC 1/SC 29, 29th Meeting, by teleconference, Jan. 11-20, 2023, Document: JVET-AC2025, pp. 1-73.

Office Action received for Japanese Patent Application No. 2025-534347, mailed on Apr. 7, 2026, 11 pages (6 pages of English Translation and 5 pages of Original Document).

* cited by examiner

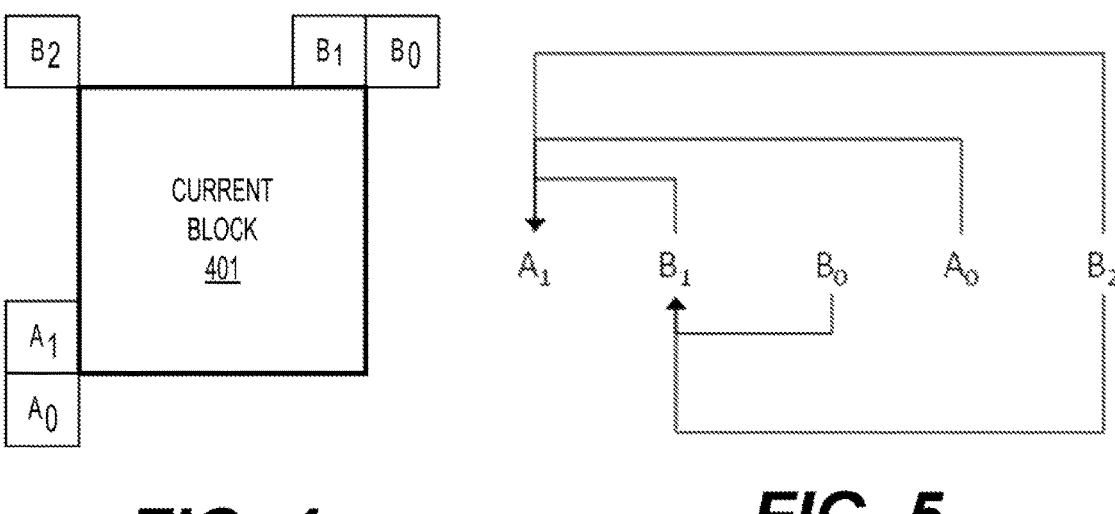
FIG. 4
FIG. 5
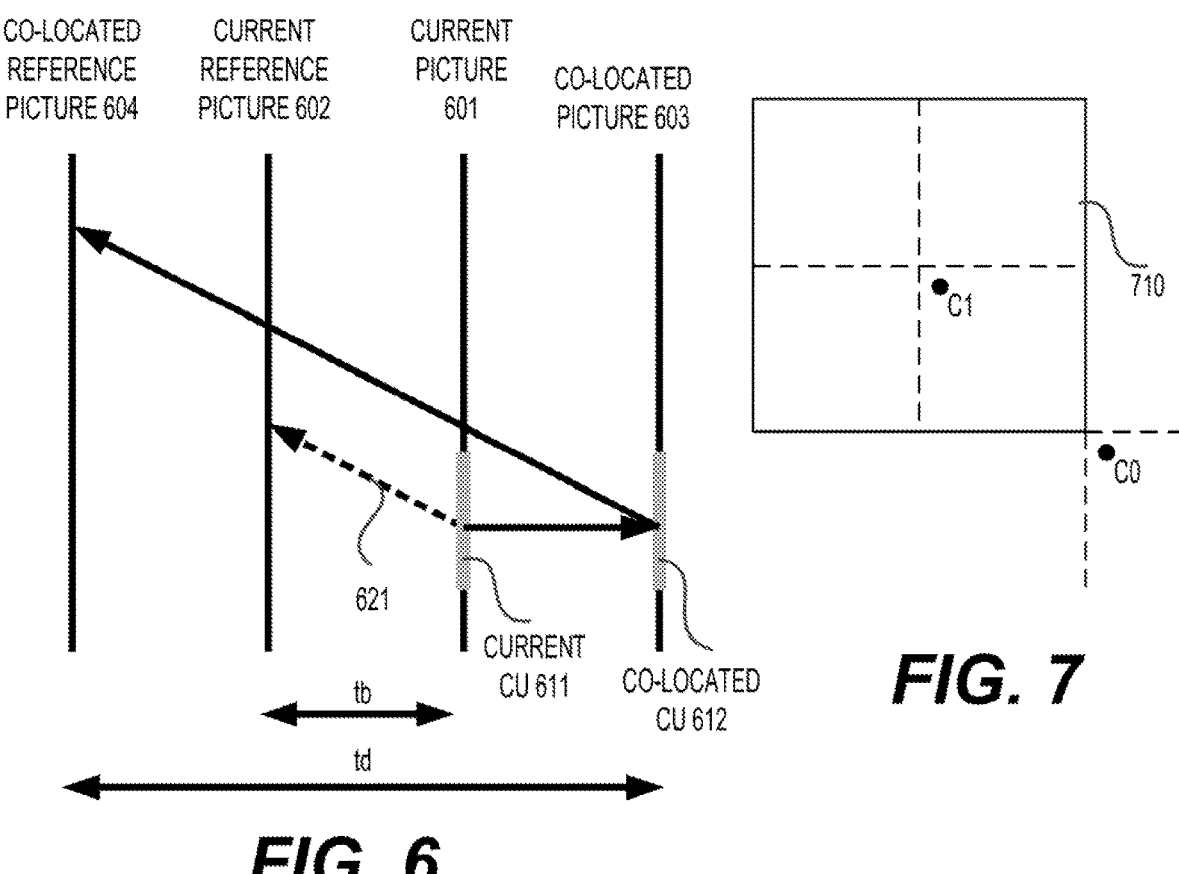
FIG. 6
FIG. 7

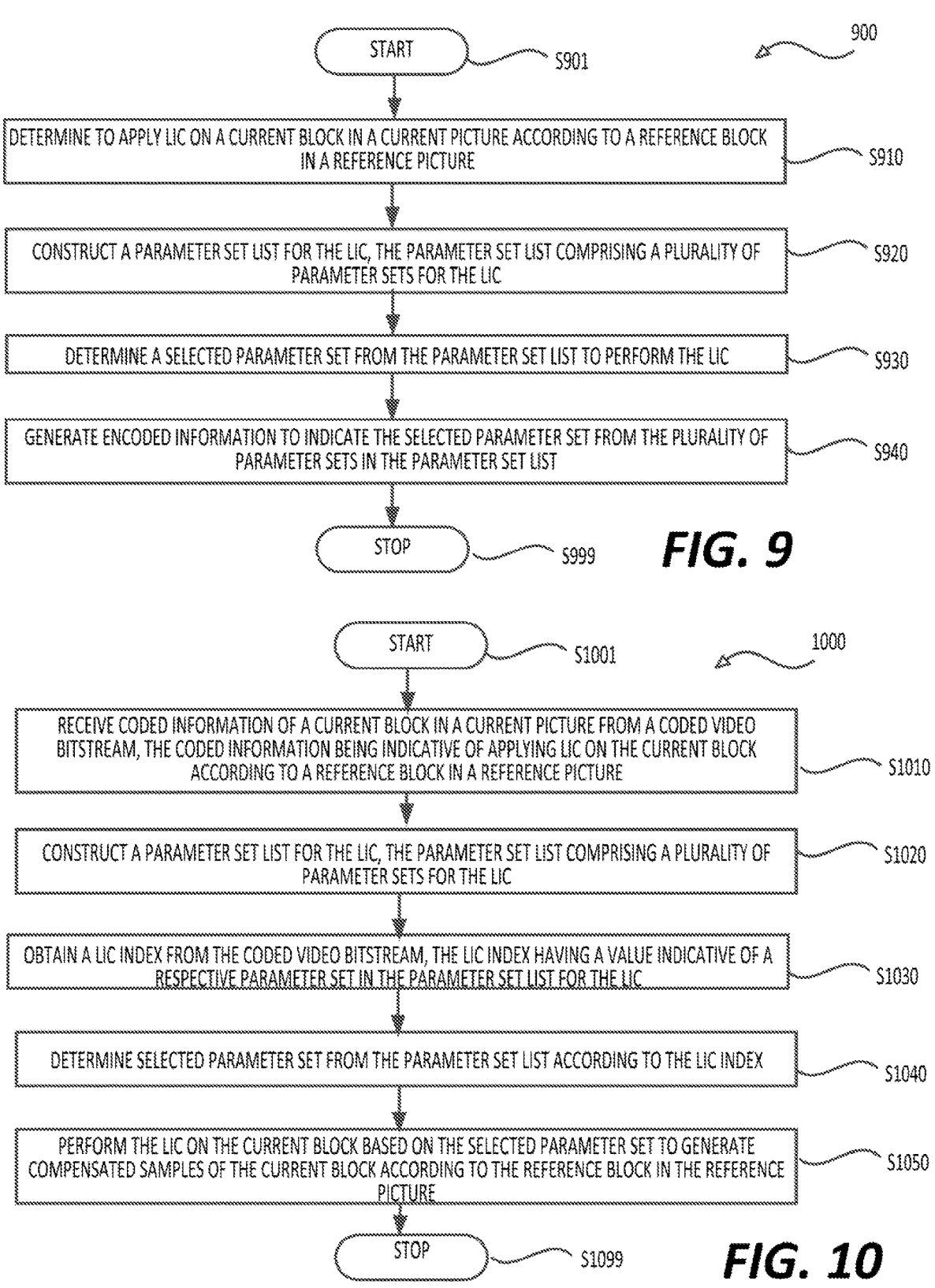

START — S901

900

DETERMINE TO APPLY LIC ON A CURRENT BLOCK IN A CURRENT PICTURE ACCORDING TO A REFERENCE BLOCK IN A REFERENCE PICTURE — S910

CONSTRUCT A PARAMETER SET LIST FOR THE LIC, THE PARAMETER SET LIST COMPRISING A PLURALITY OF PARAMETER SETS FOR THE LIC — S920

DETERMINE A SELECTED PARAMETER SET FROM THE PARAMETER SET LIST TO PERFORM THE LIC — S930

GENERATE ENCODED INFORMATION TO INDICATE THE SELECTED PARAMETER SET FROM THE PLURALITY OF PARAMETER SETS IN THE PARAMETER SET LIST — S940

STOP — S999

FIG. 9

START — S1001

1000

RECEIVE CODED INFORMATION OF A CURRENT BLOCK IN A CURRENT PICTURE FROM A CODED VIDEO BITSTREAM, THE CODED INFORMATION BEING INDICATIVE OF APPLYING LIC ON THE CURRENT BLOCK ACCORDING TO A REFERENCE BLOCK IN A REFERENCE PICTURE — S1010

CONSTRUCT A PARAMETER SET LIST FOR THE LIC, THE PARAMETER SET LIST COMPRISING A PLURALITY OF PARAMETER SETS FOR THE LIC — S1020

OBTAIN A LIC INDEX FROM THE CODED VIDEO BITSTREAM, THE LIC INDEX HAVING A VALUE INDICATIVE OF A RESPECTIVE PARAMETER SET IN THE PARAMETER SET LIST FOR THE LIC — S1030

DETERMINE SELECTED PARAMETER SET FROM THE PARAMETER SET LIST ACCORDING TO THE LIC INDEX — S1040

PERFORM THE LIC ON THE CURRENT BLOCK BASED ON THE SELECTED PARAMETER SET TO GENERATE COMPENSATED SAMPLES OF THE CURRENT BLOCK ACCORDING TO THE REFERENCE BLOCK IN THE REFERENCE PICTURE — S1050

STOP — S1099

FIG. 10

LOCAL ILLUMINATION COMPENSATION

INCORPORATION BY REFERENCE

The present application claims the benefit of priority to U.S. Provisional Application No. 63/440,084, "Improvement of Local Illumination Compensation" filed on Jan. 19, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives coded information of a current block in a current picture from a coded video bitstream, the coded information is indicative of applying local illumination compensation (LIC) on the current block according to a reference block in a reference picture. The processing circuitry constructs a parameter set list for the LIC, the parameter set list comprising a plurality of parameter sets for the LIC, and determines a selected parameter set from the parameter set list according to an index that is decoded from the coded video bitstream. For example, a LIC index is obtained from the coded video bitstream, the LIC index has a value indicative of a corresponding parameter set in the parameter set list for the LIC. The parameter set is then selected from the parameter set list according to the LIC index. The processing circuitry performs the LIC on the current block based on the selected parameter set to generate compensated samples of the current block according to the reference block in the reference picture.

In some examples, the parameter set list has a predefined constant size.

In some examples, the processing circuitry decodes a syntax of at least one of a sequence parameter set (SPS) level, a picture parameter set (PPS) level, a slice header level, and a picture header level, the syntax is indicative of the predefined constant size.

In some examples, the processing circuitry decodes a flag that indicates a use of the LIC index for indicating the selected parameter set, the flag is of at least one of a sequence parameter set (SPS) level, a picture parameter sets (PPS) level, a slice header level, a picture header level, and a block level.

In some examples, the processing circuitry decodes parameter residual information from the coded video bitstream, and determines parameters for applying the LIC based on the selected parameter set and the parameter residual information.

In some examples, the parameter set list includes at least a parameter set that has been used for applying the LIC on a spatial adjacent neighboring block of the current block.

In some examples, the parameter set list is a history based parameter set list. The processing circuitry adds a first parameter set into the history based parameter set list when the first parameter set is used for performing the LIC on a first block. In an example, the processing circuitry adds the first parameter set into the history based parameter set list in response to a redundancy check that confirms no identical parameter set to the first parameter set existing in the history based parameter set list. In some examples, the processing circuitry determines that an identical parameter set to the first parameter set exists in the history based parameter set list, and adjusts an order of the identical parameter set in the history based parameter set list. In some examples, the history based parameter set list is configured to be first-in-first-out (FIFO).

In some examples, the processing circuitry obtains a temporal parameter set that is used for performing the LIC on a collocated block in a collocated picture for the current block, and performs the LIC on the current block based on the temporal parameter set to generate compensated samples of the current block according to the reference block in the reference picture.

In some examples, the processing circuitry decodes a flag indicative of using the temporal parameter set, and in response to the flag, the processing circuitry performs the LIC on the current block based on the temporal parameter set.

In some examples, the processing circuitry decodes a flag indicative of using an LIC merge list, forms the LIC merge list that includes the parameter set list and the temporal parameter set and determines the selected parameter set from the LIC merge list based on the LIC index.

In some examples, the parameter set list includes at least a parameter set that is used to perform the LIC on a spatial non adjacent block relative to the current block. In an example, the processing circuitry scans spatial non adjacent blocks relative to the current block according to a predefined scanning order, and adds available parameter sets of the spatial non adjacent blocks to the parameter set list until the parameter set list reaches a predefined list size. The parameter set list has no redundant parameter set in an example.

In some examples, the processing circuitry decodes a flag indicative of using parameter set information from the spatial non adjacent blocks, and in response to the flag, the processing circuitry scans the spatial non adjacent blocks to form the parameter set list.

In some examples, the parameter set list includes a first parameter set that is derived by minimizing a mean square error between a template of the current block and a reference template of the reference block.

In some examples, the processing circuitry decodes the LIC index without receiving a flag indicative of applying the LIC on the current block, determines to disable the LIC in response to the LIC index being zero, and applies the LIC on the current block in response to the LIC index being greater than zero.

In some examples, the processing circuitry decodes a flag that indicates whether to apply the LIC on the current block, and decodes the LIC index in response to the flag being indicative of applying the LIC on the current block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 4 shows positions of spatial merge candidates according to an embodiment of the disclosure.

FIG. 5 shows candidate pairs that are considered for a redundancy check of spatial merge candidates according to an embodiment of the disclosure.

FIG. 6 shows exemplary motion vector scaling for a temporal merge candidate.

FIG. 7 shows exemplary candidate positions for a temporal merge candidate of a current CU.

FIG. 9 shows a flow chart outlining a process according to some embodiment of the disclosure.

FIG. 10 shows a flow chart outlining another process according to some embodiment of the disclosure.

DETAILED DESCRIPTION OF EMBODIMENTS

Figure 1:
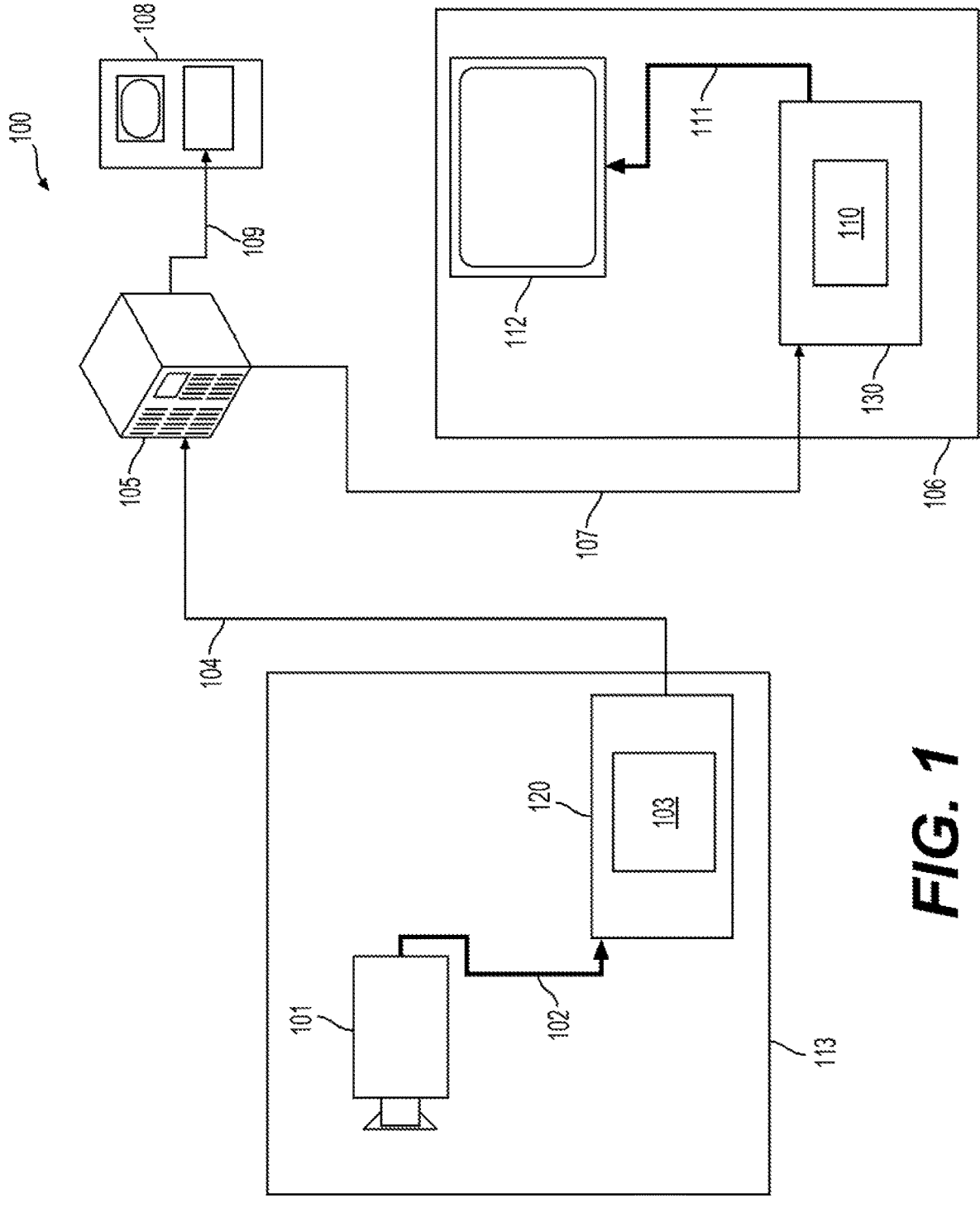
FIG. 1 is a schematic illustration of an exemplary block diagram of a communication system.

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
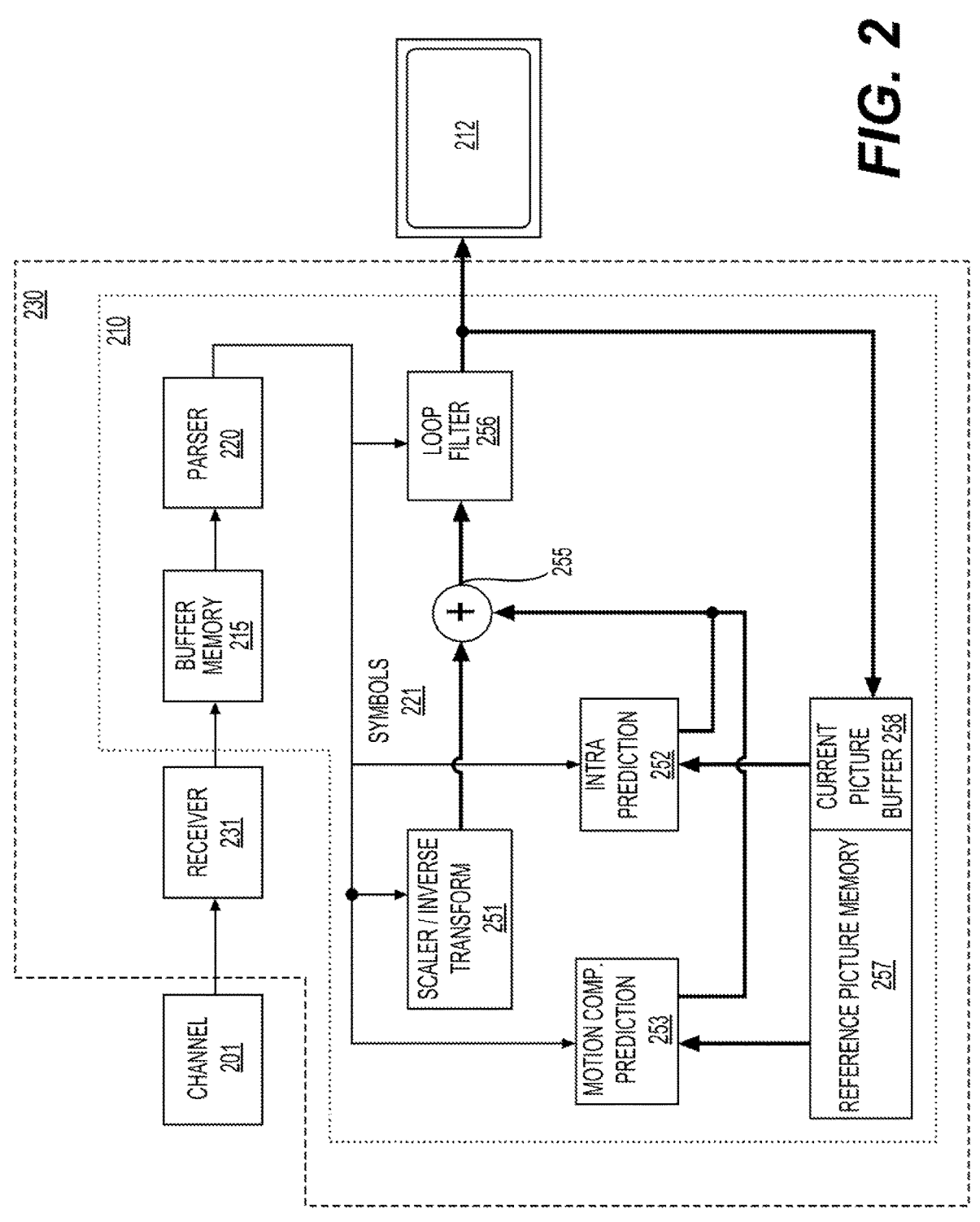
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
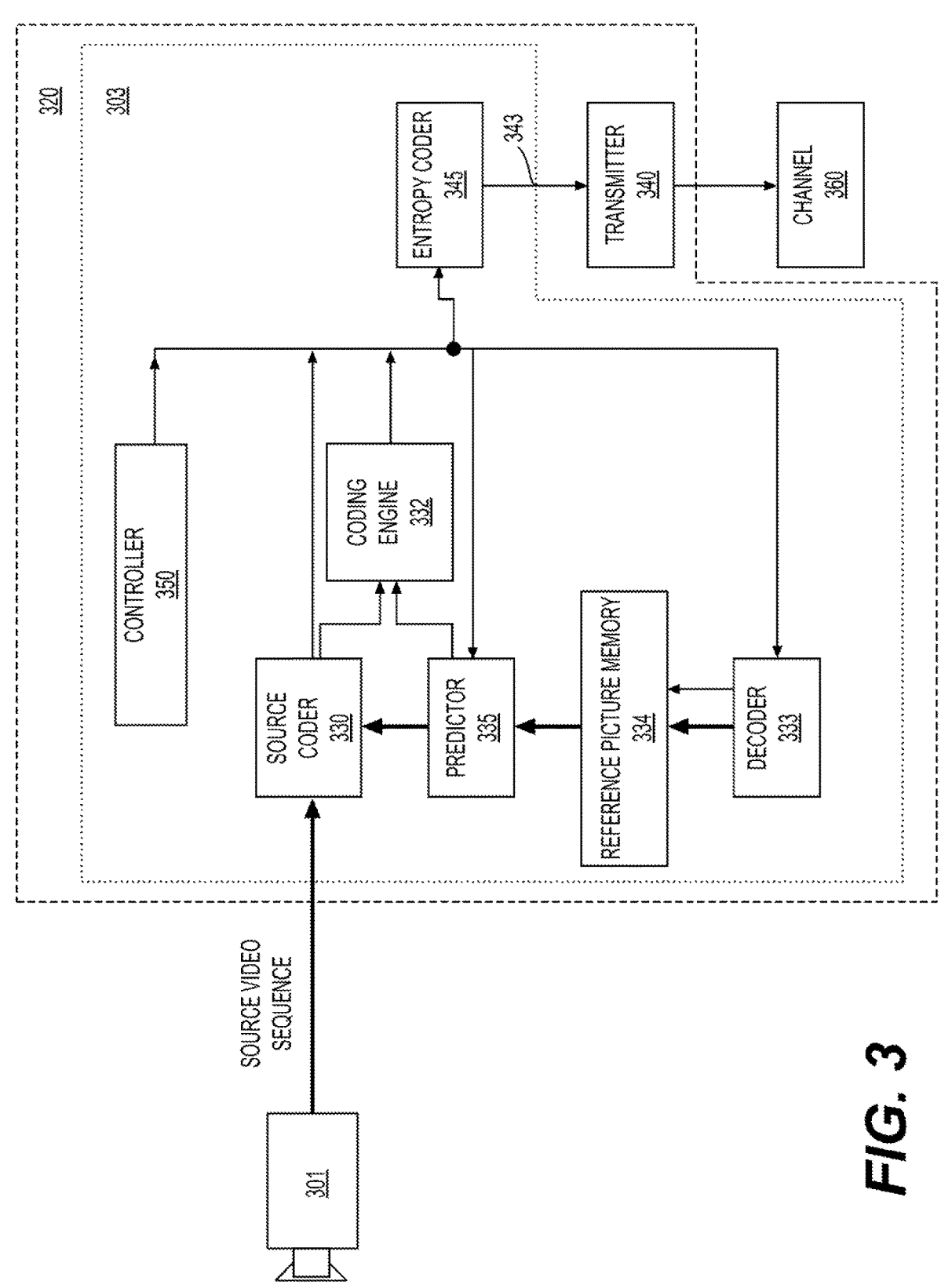
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability.

Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide further techniques that can be used with an inter prediction technique referred to as local illumination compensation (LIC), and improve coding performance.

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

In an embodiment, temporal candidate(s) are derived as follows. In an example, only one temporal merge candidate is added to the candidate list. FIG. 6 shows exemplary motion vector scaling for a temporal merge candidate. To derive the temporal merge candidate of a current CU (611) in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero. The collocated picture is a reference picture that is used as the source picture for temporal motion information derivation. The collocated picture can be identified in one of two lists, referred to as list0 or list1. In some examples, the encoder can determine the collocated picture and signal the collocated picture using suitable syntax techniques.

FIG. 7 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, inter coded, and in the current row of CTUs, the candidate position C0 is used to derive the temporal merge candidate.

In some examples, local illumination compensation (LIC) is used as an inter prediction technique to model local illumination variation between a current block and a prediction block (also referred to as reference block) of the current block by using a linear function. The prediction block is in a reference picture, and can be pointed by motion vector (MV). The parameters of the linear function can include a scale $\alpha$ and an offset $\beta$, and the linear function can be represented by $\alpha \times p[x, y] + \beta$ to compensate illumination changes, where $p[x, y]$ denotes a reference sample at a location $[x, y]$ in the reference block (also referred to as prediction block), the reference block is pointed to by MV. In some examples, the scale $\alpha$ and the offset $\beta$ can be derived based on a template of the current block and a corresponding reference template of the reference block by using the least square method, thus no signaling overhead is required, except that an LIC flag may be signaled to indicate the use of LIC. The scale $\alpha$ and the offset $\beta$ that are derived based on the template of the current block can be referred to as template based parameter set.

In some examples, LIC is used for uni-prediction inter CUs. In some examples, intra neighbor samples (neighboring samples that are predicted using intra prediction) of the current block can be used in LIC parameter derivation. In some examples, LIC is disabled for blocks with less than 32 luma samples. In some examples, for non subblock modes (e.g., non affine modes), LIC parameter derivation is performed based on the template block samples of the current CU, instead of partial template block samples for the first top-left 16×16 unit. In some examples, LIC parameter derivation is performed based on partial template block samples, such as the partial template block samples for the first top-left 16×16 unit. In some examples, template samples of the reference block are determined by using motion compensation (MC) with the MV of the block without rounding it to integer-pel precision.

Some aspects of the disclosure provide techniques for parameter adjustments to LIC, thus LIC can be flexibly adjusted, and thus can improve the accuracy of the illuminance compensation when the LIC is enabled.

According to an aspect of the disclosure, a parameter set list for LIC can be suitable constructed. Various techniques can be used to construct the parameter set list. In some examples, the parameter set list can be constructed based on parameter sets of adjacent spatial neighbors of a current block. Further, the parameter set list can be constructed based on LIC parameter sets of other suitable blocks, such as non adjacent reconstructed blocks, temporal collocated blocks, and the like. In some examples, any suitable techniques that are used to form a merge candidate list can be used to form the parameter set list. The parameter set list includes a plurality of parameter sets (also referred to as candidate parameter sets) for one or more models of LIC. When the parameter set list is constructed, an index that indicates which parameter set in the parameter set list is used for LIC can be signaled.

In some embodiments, the list size for the parameter set list is a predefined constant size. In an example, the list size can be signaled in the high layer syntax, such as but not limit to a sequence parameter set (SPS), a picture parameter sets (PPS), slice header, picture header and the like.

In some embodiments, a flag at block level is signal to indicate whether index-based (parameter set list based) parameter derivation method is used or not when a block is coded in LIC mode. If the flag is true, the index is signaled to indicate which parameter set in the parameter set list is used. In an example, a high level syntax, such as but not limit to SPS, PPS, slice header, picture, . . . , and the like, is signaled to control whether the index-based (parameter set list based) parameter derivation method is used or not. In some examples, a LIC parameter residual may be further signaled in addition to the selected parameter set of LIC.

In some embodiments, the parameter set list can be a history based parameter set list. In some examples, when a parameter set is used in coding (encoding/decoding) a current block, the parameter set (also referred to as current parameter set) can be stored in the history based parameter set list for LIC. In some examples, redundancy check can be applied to check whether the parameters of the current parameter set are identical to the parameters of one of the parameter sets already in the history based parameter set list. To determine whether two parameter sets are identical, in an example, when all the parameters in one of the two parameter sets are the same as the corresponding parameters in the other one of the two parameter sets, the two parameter sets are identical. In another example, when the differences of corresponding parameters in the two parameter sets are equal to or less than certain threshold, the two parameter sets are considered as identical. In some examples, when the current parameter set of LIC that is used for coding the current block is not identical to any existing parameter set in the history based parameter set list, the current parameter set can be added into the history based parameter set list. Otherwise, the current parameter set that is used for coding current block can be discarded.

Further in an example, when an identical parameter set in the history based parameter set list is identified for the current parameter set, the parameter sets in the history based parameter set list are reordered, thus the identical parameter set is reordered to be associated with a lower (or higher) index value.

In some embodiments, the history based parameter set list is configured as first-in-first-out (FIFO) buffer for storing the parameter sets. The oldest parameter set can be removed from the parameter set list when a new parameter set is added into the history based parameter set list.

In some embodiments, the history based parameter set list can be reset or cleaned, for example at the beginning of a CTU, a slice, a tile, a segment, a picture, . . . , and the like.

According to an aspect of disclosure, a parameter set for LIC can be derived from a collocated position in a collocated picture when a collocated block at the collocated position in the collocated picture is coded according to LIC. The parameter set used for coding the collocated block according to LIC can be referred to as temporal LIC parameter set.

In some embodiments, a flag (e.g., a second flag) is signaled to indicate whether the temporal LIC parameter set is used or not when the LIC flag (e.g., a first flag) is true for the current block.

In some embodiments, an LIC merge list can be derived to include the temporal LIC parameter set and the parameter set list (e.g., stored in a buffer). In some examples, a flag is signaled to indicate whether the LIC merge list is used or not for a current block. When the flag is true, the LIC merge list is derived and an index is signaled to indicate which parameter set in the LIC merge list is selected for coding the current block according to LIC.

According to an aspect of the disclosure, the parameter set derivation (e.g., construction of a parameter set list) for LIC can be performed based on at least one non-adjacent blocks (meaning a specific location in a reconstructed area relative to the current block, given the current block location and width/height). A none-adjacent block is not at an immediate adjacent reconstructed position to the current block. The technique to construct the parameter set list based on the non-adjacent blocks is referred to as non-adjacent parameter set construction.

Figure 8:
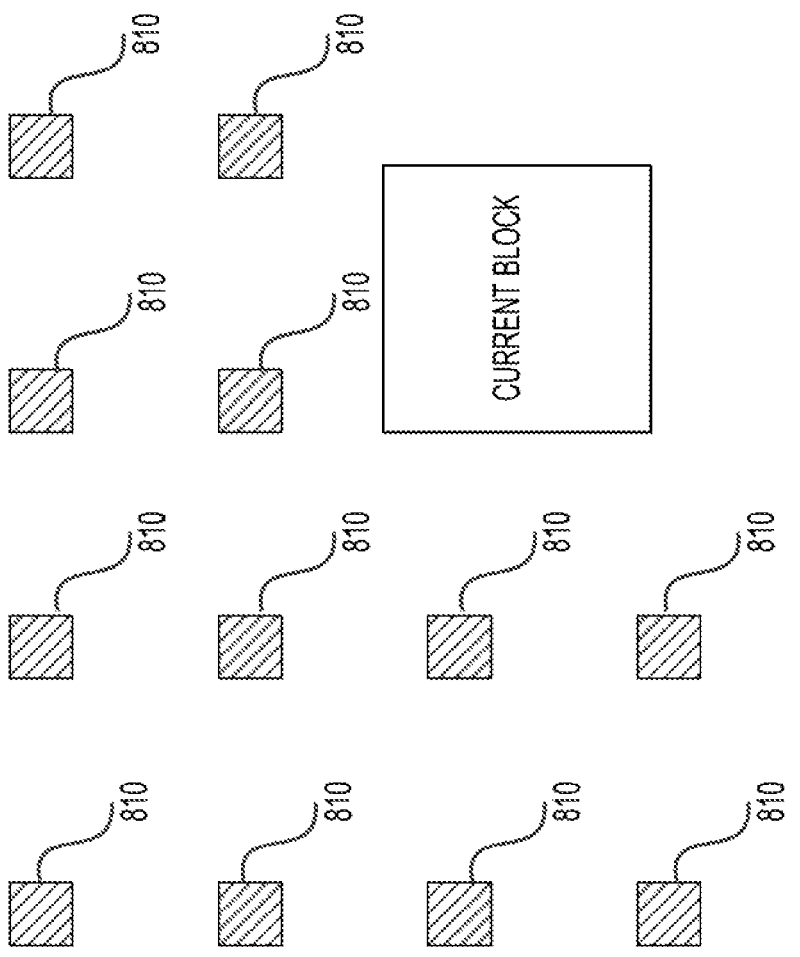
FIG. 8 shows a diagram that illustrates spatial non-adjacent blocks relative to a current block in some examples.

FIG. 8 shows a diagram (800) that illustrates non-adjacent blocks (810) that can be used to derive LIC parameter set for coding the current block according to LIC. In some embodiments, the non-adjacent blocks (810) can be evenly distributed in a reconstructed area (e.g., within a same CTU with the current block) relative to the current block, the reconstructed area can be determined based on size of the current block, such as the width W and the height H of the current block. In some examples, when a non-adjacent block is coded based on LIC, after the reconstruction of the non-adjacent block, the parameter set for LIC (also referred to as LIC parameter set) is stored for example in a buffer. The LIC parameter set can be retrieved when the non-adjacent block is available and put in the parameter set list for coding the current block.

In some embodiments, a predefined scanning order and a predefined list size are used to construct the parameter set list from the non-adjacent blocks. For example, the non-adjacent blocks are scanned according to the predetermined scanning order to fill LIC parameter set into a buffer (for storing parameter set list) of the predetermined list size. It is noted that, in some examples, the redundant parameter set will not be added in the parameter set list during the construction of the parameter set list.

In some examples, a flag is firstly signaled to indicate when the non-adjacent parameter set construction is used or not. When the flag is true, an index is signaled to indicate which parameter set in the parameter set list is used for coding the current block according to LIC.

In some examples, an LIC flag is signaled to indicate whether the LIC is used for coding the current block and when the LIC flag indicates the use of the LIC, an index is signaled, and the index indicates the selected parameter set in a parameter set list. In some other examples, the index is signaled without signaling the LIC flag.

According to an aspect of the disclosure, the derived LIC parameter set according to the template of the current block (template based parameter set) is one of the parameter set in the parameter set list. Typically, the template based parameter set is the first parameter set in the parameter set list.

In an example, the LIC flag is signaled. When the LIC flag indicates of using LIC, an index (also referred to as an indicator in some examples) is signaled. When the index is 0, the template based parameter set is selected for LIC, and when the index is larger than 0, other suitable parameter set in the parameter set list is selected for LIC. In another example, the LIC flag is not signaled, and an index is signaled. When the index is 0, LIC is not used in coding the current block. When the index is 1, the template based parameter set is selected for LIC, and when the index is larger than 1, other suitable parameter set in the parameter set list is selected for LIC.

FIG. 9 shows a flow chart outlining a process (900) according to an embodiment of the disclosure. The process (900) can be used in a video encoder. In various embodiments, the process (900) is executed by processing circuitry, such as the processing circuitry that performs functions of the video encoder (103), the processing circuitry that performs functions of the video encoder (303), and the like. In some embodiments, the process (900) is implemented in software instructions, thus when the processing circuitry executes the software instructions, the processing circuitry performs the process (900). The process starts at (S901) and proceeds to (S910).

At (S910), to apply local illumination compensation (LIC) on a current block in a current picture according to a reference block in a reference picture is determined.

At (S920), a parameter set list for the LIC is constructed. The parameter set list includes a plurality of parameter sets for the LIC.

At (S930), a selected parameter set from the parameter set list to perform the LIC is determined. The selected parameter set can be determined to achieve the best accuracy for illumination compensation.

At (S940), encoded information is generated in a coded video bitstream to indicate the selected parameter set from the plurality of parameter sets in the parameter set list.

In some examples, the parameter set list has a predefined constant size. In an example, a syntax of at least one of a sequence parameter set (SPS) level, a picture parameter set (PPS) level, a slice header level, and a picture header level, is encoded into the coded video bitstream, and the syntax is indicative of the predefined constant size.

In some examples, a flag that indicates a use of the index (also referred to as LIC index) for indicating the selected parameter set is encoded into the coded video bitstream. The flag is of at least one of a sequence parameter set (SPS) level, a picture parameter sets (PPS) level, a slice header level, a picture header level, and a block level.

In some examples, the parameters for applying the LIC to achieve the best accuracy in the illumination compensation are different from the selected parameter set, and parameter residual information between the parameters and the selected parameter set is encoded into the coded video bitstream.

In some examples, the parameter set list includes at least a parameter set that has been used for applying the LIC on a spatial adjacent neighboring block of the current block.

In some examples, the parameter set list is a history based parameter set list. In an example, when a first parameter set is used for performing the LIC on a first block, the first parameter set is added into the history based parameter set list.

In some examples, a redundancy check is performed. In response to the redundancy check that confirms no identical parameter set to the first parameter set existing in the history based parameter set list, the first parameter set is added into the history based parameter set list.

In some examples, when the redundancy check determines that an identical parameter set to the first parameter set exists in the history based parameter set list, an order of the identical parameter set in the history based parameter set list is adjusted.

In some examples, the history based parameter set list is configured to be first-in-first-out (FIFO).

In some examples, a temporal parameter set that is used for performing the LIC on a collocated block in a collocated picture for the current block is obtained. The LIC can be performed on the current block based on the temporal parameter set to generate the compensated samples of the current block according to the reference block in the reference picture.

In some examples, a flag indicative of using the temporal parameter set is encoded into the coded video bitstream.

In some examples, a flag indicative of using an LIC merge list is encoded into the bitstream. Then, the LIC merge list that includes the parameter set list and the temporal parameter set is formed. The LIC index indicates the selected parameter set from the LIC merge list.

In some examples, the parameter set list includes at least a parameter set that is used to perform the LIC on a spatial non adjacent block relative to the current block. To construct the parameter set list, spatial non adjacent blocks relative to the current block are scanned according to a predefined scanning order. Available parameter sets of the spatial non adjacent blocks are added to the parameter set list until the parameter set list reaches a predefined list size. In an example, the parameter set list has no redundant parameter set.

In some examples, a flag indicative of using parameter set information from the spatial non adjacent blocks is encoded into the coded video bitstream.

In some examples, the parameter set list comprises a first parameter set that is derived by minimizing a mean square error between a template of the current block and a reference template of the reference block.

In some examples, the LIC index is encoded into the coded video bitstream without encoding a flag indicative of applying the LIC on the current block into the coded video bitstream. When the LIC index is zero, the LIC index indicates to disable the LIC.

In some examples, a flag that indicates whether to apply the LIC on the current block is encoded into the coded video bitstream. In response to the flag being indicative of applying the LIC on the current block, the LIC index is encoded into the coded video bitstream. The LIC index indicates the selected parameter set from the parameter set list.

Then, the process proceeds to (S999) and terminates.

The process (900) can be suitably adapted. Step(s) in the process (900) can be modified and/or omitted. Additional step(s) can be added. Any suitable order of implementation can be used.

FIG. 10 shows a flow chart outlining a process (1000) according to an embodiment of the disclosure. The process (1000) can be used in a video decoder. In various embodiments, the process (1000) is executed by processing circuitry, such as the processing circuitry that performs functions of the video decoder (110), the processing circuitry that performs functions of the video decoder (210), and the like. In some embodiments, the process (1000) is implemented in software instructions, thus when the processing circuitry executes the software instructions, the processing circuitry performs the process (1000). The process starts at (S1001) and proceeds to (S1010).

At (S1010), coded information of a current block in a current picture is received from a coded video bitstream, the coded information is indicative of applying local illumination compensation (LIC) on the current block according to a reference block in a reference picture.

At (S1020), a parameter set list for the LIC is constructed, the parameter set list includes a plurality of parameter sets for the LIC.

At (S1030), a LIC index is obtained from the coded video bitstream. The LIC index has a value indicative of a respective parameter set in the parameter set list for the LIC.

At (S1040), a selected parameter set is determined from the parameter set list according to the LIC index.

At (S1050), the LIC is performed on the current block based on the selected parameter set to generate compensated samples of the current block according to the reference block in the reference picture.

In some examples, the parameter set list has a predefined constant size. In an example, a syntax of at least one of a sequence parameter set (SPS) level, a picture parameter set (PPS) level, a slice header level, and a picture header level, is decoded, and the syntax is indicative of the predefined constant size.

In some examples, a flag that indicates a use of the LIC index for indicating the selected parameter set is decoded. The flag is of at least one of a sequence parameter set (SPS) level, a picture parameter sets (PPS) level, a slice header level, a picture header level, and a block level.

In some examples, parameter residual information is decoded from the coded video bitstream. Then, the parameters for applying the LIC are determined based on the selected parameter set and the parameter residual information.

In some examples, the parameter set list includes at least a parameter set that has been used for applying the LIC on a spatial adjacent neighboring block of the current block.

In some examples, the parameter set list is a history based parameter set list. In an example, when a first parameter set is used for performing the LIC on a first block, the first parameter set is added into the history based parameter set list.

In some examples, a redundancy check is performed. In response to the redundancy check that confirms no identical parameter set to the first parameter set existing in the history based parameter set list, the first parameter set is added into the history based parameter set list.

In some examples, when the redundancy check determines that an identical parameter set to the first parameter set exists in the history based parameter set list, an order of the identical parameter set in the history based parameter set list is adjusted.

In some examples, the history based parameter set list is configured to be first-in-first-out (FIFO).

In some examples, a temporal parameter set that is used for performing the LIC on a collocated block in a collocated picture for the current block is obtained. The LIC can be performed on the current block based on the temporal parameter set to generate compensated samples of the current block according to the reference block in the reference picture.

In some examples, a flag indicative of using the temporal parameter set is decoded. In response to the flag, the LIC is performed on the current block based on the temporal parameter set.

In some examples, a flag indicative of using an LIC merge list is decoded. Then, the LIC merge list that includes the parameter set list and the temporal parameter set is formed. The selected parameter set is determined from the LIC merge list based on the LIC index.

In some examples, the parameter set list includes at least a parameter set that is used to perform the LIC on a spatial non adjacent block relative to the current block. To construct the parameter set list, spatial non adjacent blocks relative to the current block are scanned according to a predefined scanning order. Available parameter sets of the spatial non adjacent blocks are added to the parameter set list until the parameter set list reaches a predefined list size. In an example, the parameter set list has no redundant parameter set.

In some examples, a flag indicative of using parameter set information from the spatial non adjacent blocks is decoded. In response to the flag, the spatial non adjacent blocks are scanned to form the parameter set list.

In some examples, the parameter set list comprises a first parameter set that is derived by minimizing a mean square error between a template of the current block and a reference template of the reference block.

In some examples, the LIC index is decoded without receiving a flag indicative of applying the LIC on the current block. The LIC can be disabled in response to the LIC index being zero, and the LIC is applied on the current block in response to the LIC index being greater than zero, the LIC index indicates the selected parameter set from the parameter set list.

In some examples, a flag that indicates whether to apply the LIC on the current block is decoded. In response to the flag being indicative of applying the LIC on the current block, the LIC index is decoded. The LIC index indicates the selected parameter set from the parameter set list.

Then, the process proceeds to (S1099) and terminates.

The process (1000) can be suitably adapted. Step(s) in the process (1000) can be modified and/or omitted. Additional step(s) can be added. Any suitable order of implementation can be used.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
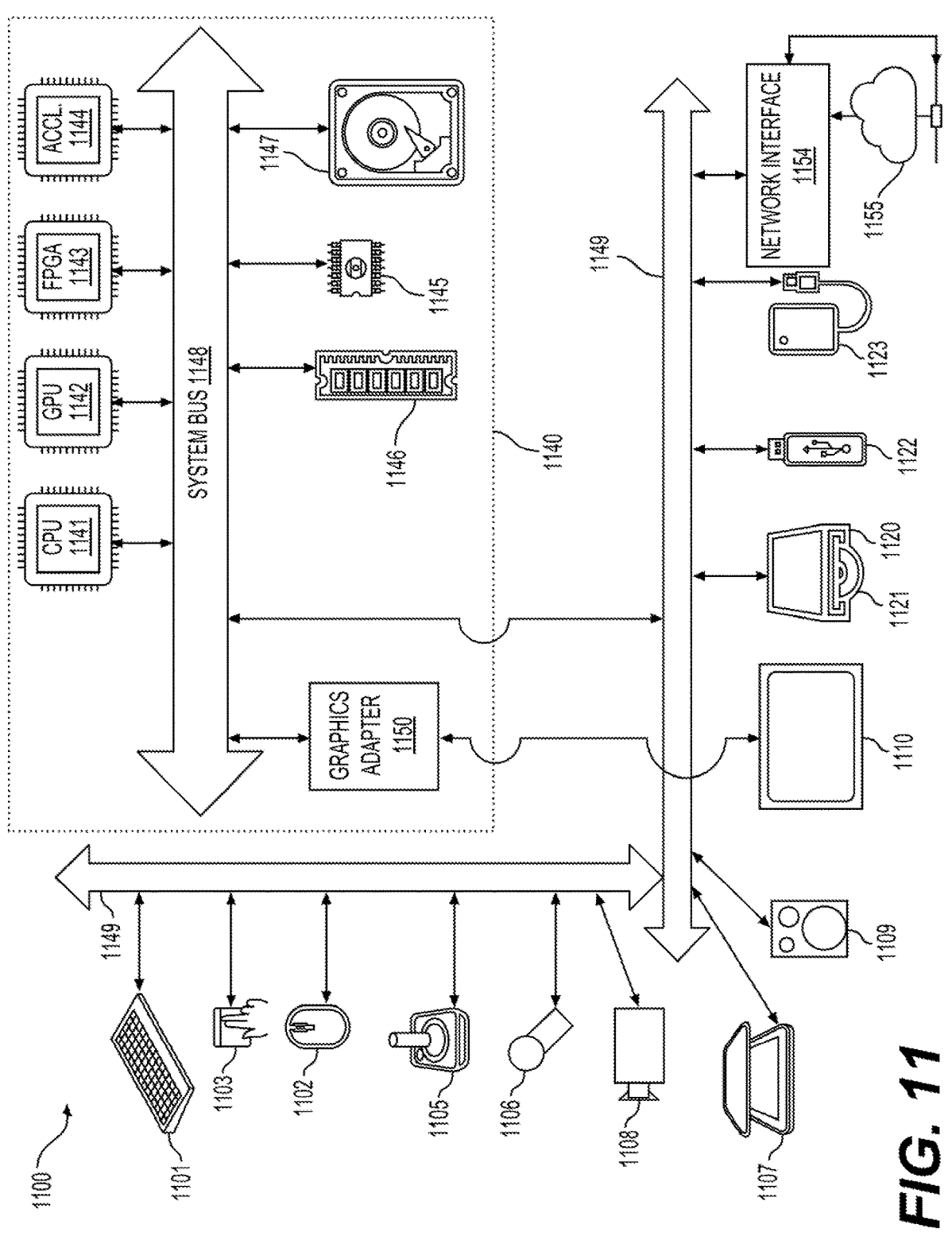
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving coded information of a current block in a current picture from a coded video bitstream, the coded information being indicative of applying a local illumination compensation (LIC) on the current block according to a reference block in a reference picture;

decoding a flag from the coded information;

constructing a parameter set list for the LIC, the parameter set list comprising a plurality of parameter sets for the LIC, the constructing including scanning spatial non adjacent blocks relative to the current block to construct the parameter set list when the flag indicates that parameter set information from the spatial non adjacent blocks is used, the plurality of parameter sets for the LIC including a parameter set used to perform the LIC on one of the spatial non adjacent blocks;

obtaining a LIC index from the coded video bitstream, the LIC index having a value indicative of a parameter set in the parameter set list for the LIC;

determining a selected parameter set from the parameter set list according to the LIC index;

determining parameters for applying the LIC based on the selected parameter set; and performing the LIC on the current block based on the parameters for applying the LIC to generate compensated samples of the current block according to the reference block in the reference picture.

2. The method of claim 1, wherein the parameter set list has a predefined constant size.

3. The method of claim 2, further comprising:

decoding a syntax element of at least one of a sequence parameter set (SPS) level, a picture parameter set (PPS) level, a slice header level, and a picture header level, the syntax element having a value indicative of the predefined constant size.

4. The method of claim 1, further comprising:

decoding a flag that indicates a use of the LIC index for indicating the selected parameter set, the flag is of at least one of a sequence parameter set (SPS) level, a picture parameter sets (PPS) level, a slice header level, a picture header level, and a block level.

5. The method of claim 1, wherein the parameter set list comprises at least a parameter set that has been used for applying the LIC on a spatial adjacent neighboring block of the current block.

6. The method of claim 1, wherein the parameter set list is a history based parameter set list, and the method comprises:

adding a first parameter set into the history based parameter set list when the first parameter set is used for performing the LIC on a first block.

7. The method of claim 6, wherein the adding the first parameter set into the history based parameter set list further comprises:

adding the first parameter set into the history based parameter set list when a redundancy check confirms no identical parameter set to the first parameter set existing in the history based parameter set list.

8. The method of claim 7, further comprising:

determining that an identical parameter set to the first parameter set exists in the history based parameter set list; and adjusting an order of the identical parameter set in the history based parameter set list.

9. The method of claim 6, wherein the history based parameter set list is configured to be first-in-first-out (FIFO).

10. The method of claim 1, further comprising:

obtaining a temporal parameter set that is used for performing the LIC on a collocated block in a collocated picture for the current block; and performing the LIC on the current block based on the temporal parameter set to generate compensated samples of the current block according to the reference block in the reference picture.

11. The method of claim 10, further comprising:

decoding a flag indicative of using the temporal parameter set; and performing the LIC on the current block based on the temporal parameter set when the flag indicates the temporal parameter set is used.

12. The method of claim 10, further comprising:

decoding a flag indicative of using an LIC merge list;

forming the LIC merge list that includes the parameter set list and the temporal parameter set; and determining the selected parameter set from the LIC merge list based on the LIC index.

13. The method of claim 1, wherein the constructing the parameter set list further comprises:

scanning the spatial non adjacent blocks relative to the current block according to a predefined scanning order; and adding available parameter sets of the spatial non adjacent blocks to the parameter set list until the parameter set list reaches a predefined list size.

14. The method of claim 13, wherein the parameter set list has no redundant parameter set.

15. The method of claim 1, wherein the flag is indicative of using the parameter set information from the spatial non adjacent blocks.

16. The method of claim 1, wherein the parameter set list comprises a first parameter set that is derived by minimizing a mean square error between a template of the current block and a reference template of the reference block.

17. The method of claim 1, further comprising:

decoding the LIC index without receiving a flag indicative of applying the LIC on the current block;

determining to disable the LIC when the LIC index is zero; and applying the LIC on the current block when the LIC index is greater than zero.

18. A method of video encoding, comprising:

determining to apply a local illumination compensation (LIC) on a current block in a current picture according to a reference block in a reference picture;

constructing a parameter set list for the LIC, the parameter set list including a plurality of parameter sets for the LIC, the constructing including scanning spatial non adjacent blocks relative to the current block to construct the parameter set list, the plurality of parameter sets for the LIC including a parameter set used to perform the LIC on one of the spatial non adjacent blocks;

selecting a parameter set from the parameter set list for the LIC, the LIC being applied on the current block based on the selected parameter set; and encoding an LIC index and a flag into coded information of the current block in a bitstream, the LIC index being indicative of the selected parameter set from the parameter set list, the flag indicating that parameter set information from the spatial non adjacent blocks is used.

19. A non-transitory computer-readable storage medium storing instructions which when executed by a processor cause the processor to perform an encoding method comprising:

determining to apply a local illumination compensation (LIC) on a current block in a current picture according to a reference block in a reference picture;

constructing a parameter set list for the LIC, the parameter set list including a plurality of parameter sets for the LIC, the constructing including scanning spatial non adjacent blocks relative to the current block to construct the parameter set list, the plurality of parameter sets for the LIC including a parameter set used to perform the LIC on one of the spatial non adjacent blocks;

selecting a parameter set from the parameter set list for the LIC, the LIC being applied on the current block based on the selected parameter set;

encoding an LIC index and a flag into coded information of the current block in a bitstream, the LIC index being indicative of the selected parameter set from the parameter set list, the flag indicating that parameter set information from the spatial non adjacent blocks is used; and transmitting the bitstream.

20. The method of claim 1, wherein the method further includes decoding parameter residual information from the coded video bitstream; and the determining the parameters includes determining the parameters based on the selected parameter set and the parameter residual information, the parameter residual information indicating differences between the parameters and the selected parameter set.

* * * * *